Patented Nov. 18, 1947

2,430,908

UNITED STATES PATENT OFFICE 2,430,908

PROCESS FOR OBTAINING N-ALKOXY-METHYL POLYAMIDES

Theodore Le Sueur Cairns, Wilmington, Del., assignor to E. I. du Pont de Nemours & Company, Wilmington, Del., a corporation of Delaware No Drawing. Application July 18, 1944, Serial No. 545,535

7 Claims. (Cl. 260—72)

This invention relates to polymeric materials, and more particularly to the manufacture of certain modified polyamides of the nylon type.

The modified polyamides with which this invention is concerned, namely, the N-alkoxymethyl polyamides, are obtained in the manner more particularly pointed out hereinafter from the synthetic linear polyamides having an intrinsic viscosity of at least 0.4 as described in United States Patents 2,071,250, 2,071,253, and 2,130,948.

In my application Serial No. 445,635, filed June 3, 1942, I have disclosed methods for the chemical modification of the above-mentioned polyamides which yields polymers readily soluble in hot ethanol and in other common inexpensive solvents in which most of the unmodified polyamides are insoluble. These methods involve reacting the linear polyamides with formaldehyde and an alcohol in the presence of an oxygen containing acid. The procedure converts the functional group

in the case of the polyamides to the functional group

where R is the organic radical derived from the alcohol used. In one of these methods whereby the linear polyamides having a hydrogen bearing amide group are converted to the soluble N-alkoxymethyl polyamides, the linear polyamide is dissolved in the oxygen containing acid, which most desirably is formic acid, and this solution is reacted by heating with a mixture of alcohol and paraformaldehyde.

A second or direct method for obtaining the N-alkoxymethyl polyamides consists in heating the synthetic linear polyamide with formaldehyde and alcohol in the presence of a small amount of the oxygen containing acid which in this method is most advantageously phosphoric acid. The method, however, has previously presented a difficulty in that the primary polyamide chain is always degraded to a certain extent and the products consequently have less desirable properties for certain uses.

This invention has as an object an improved method for the production of N-alkoxymethyl polyamides by the last mentioned method which involves reaction with the oxygen containing acid, but which very substantially reduces the degradation in the polyamide chain previously referred to. Other objects will appear hereinafter.

The above objects are accomplished by reacting a synthetic linear polyamide, having an intrinsic viscosity of at least 0.4 and having hydrogen bearing carbonamide groups, with formaldehyde and alcohol in the presence of buffered oxygen containing acid. The oxygen containing acids used in the practice of this invention have an ionization constant at least as great as $9.6 \times 10^{-6}$ and an equivalent conductance, measured at 25° C. in 0.01N concentration, no greater than 370 ohms$^{-1}$cm$^2$. An aqueous solution of the buffered acid, at the approximate concentrations employed (about 0.1–2.0% of the oxygen-containing acid in the liquid reaction mixture) for the purpose of this invention has a pH of greater than 1.5 and less than 6.5.

The buffering compounds best used in the practice of this invention are tertiary amines and alkali salts of a weak acid, that is of an acid having an ionization constant less than $1 \times 10^{-2}$.

A method generally applicable for preparing N-alkoxymethyl polyamides by the present process comprises placing solid polyhexamethylene adipamide, formaldehyde, methanol, water, phosphoric acid, and the buffer compound which is preferably pyridine, in an agitated pressure vessel, heating the mixture to reaction temperature (120–140° C.) discharging the resulting solution and isolating the N-methoxymethyl polyhexamethylene adipamide.

The extent of degradation of the primary polyamide chain has been estimated by the measurement of the absolute viscosity of solutions of the N-alkoxymethyl polyamide in 85% aqueous phenol. The procedure consists in preparing a 5% solution of the polyamide in 85% phenol and determining the viscosity by standard methods. The improvement in viscosity resulting from using reaction mixtures differing only in the use of buffered phosphoric in one instance and unbuffered phosphoric acid in the other is shown by the fact that the N-alkoxymethyl polyamide obtained with unbuffered phosphoric acid had an absolute viscosity of only 48 centipoises as compared to 70 centipoises for the polymer obtained with buffered phosphoric acid.

The invention is further illustrated by the following examples in which the parts are by weight:

*Example 1*

In a closed stainless steel reaction vessel was placed 100 parts of polyhexamethylene adipamide (intrinsic viscosity about 1.0) which had been pulverized to about 10 mesh, 100 parts of paraformaldehyde, 200 parts absolute ethanol, 15 parts water, 3.4 parts 85% phosphoric acid, and 9.8 parts of pyridine. The entire mixture was heated with agitation to 125° C. and maintained between 125–135° C. for 15 minutes and then cooled rapidly to room temperature. The product was a soft translucent gel which was dissolved in hot aqueous ethanol containing sufficient ammonia to neutralize the phosphoric acid. The resulting solution was filtered to remove a small quantity of insoluble material and the filtrate poured into a large volume of dilute sodium hydroxide. The N-ethoxymethyl polyhexamethylene adipamide separated as a soft plastic mass which gradually hardened. This mass was broken up, washed thoroughly in running water and allowed to dry at room temperature. This product was found to have an absolute viscosity of 66 cps. for a 5% solution in 85% phenol. Control experiments using the same materials and procedure but no pyridine gave products of viscosity of about 50 cps.

*Example II*

In a closed stainless steel reaction vessel was placed 100 parts of polyhexamethylene adipamide (intrinsic viscosity about 1.0) pulverized to about 10 mesh, 100 parts paraformaldehyde, 200 parts absolute alcohol, 15 parts water, 3.4 parts 85% phosphoric acid and 10 parts disodium phosphate. The entire mixture was heated to 125° C. maintained at 125–135° C. for 15 minutes and then cooled rapidly to room temperature. The product was soft translucent gel which was dissolved in hot aqueous ethanol containing sufficient ammonia to neutralize phosphoric acid. The resulting solution was filtered to remove a small amount of insoluble material and the filtrate poured into a large volume of dilute sodium hydroxide. The N-ethoxymethyl polyhexamethylene adipamide separated as a soft plastic mass which soon became hard. This was broken up, washed thoroughly with water and allowed to dry at room temperature. This product was found to have a viscosity of 69.8 cps. Control experiments using the same materials and procedure but no disodium phosphate gave products of viscosity of about 50 cps.

Other oxygen-containing acids of the kind previously defined can be used instead of phosphoric acid. Examples of these acids include p-toluene sulfonic, other acids of phosphorous, substituted acetic acids, etc.

The buffers which may be used in this invention are tertiary amines and alkali salts of weak acids. The compounds other than those mentioned in the examples that can be used as buffers include quinoline, dimethyl aniline, N-methyl morpholine, trisodium phosphate, sodium acetate, potassium benzoate, sodium propionate and sodium carbonate. In the case of the above-mentioned amines the quantity that can be used will vary over rather wide limits, the amount in general varying from one part to thirty parts per part of phosphoric acid. With the alkali salts of weak acids the amount used will depend on the strength of the acid from which the salt is derived. The stronger the acid from which the salt is derived the more may be used. For example, more disodium phosphate per part of phosphoric acid may be used than will be found to be operable in the case of sodium acetate. With disodium phosphate the quantities will generally range from one part to thirty parts of salt per part of phosphoric acid.

Examples of additional alcohols that can be used in carrying out this invention are methanol, propanol, isopropanol, butanol, cetyl alcohol, lauryl alcohol, benzyl alcohol, ethylene glycol, alcohols containing hetero atoms such as methyl ether of ethylene glycol, methyl glycolate, and unsaturated alcohols such as allyl alcohol. If a mixed alkoxymethyl polyamide is desired a mixture of alcohols can be used.

The formaldehyde is best used in an amount of from 0.1 to 10 parts by weight per part of polyamide. It is usually desirable to use the formaldehyde and alcohol in a 1 to 1.5 molar ratio, but the ratio can be varied from about 2 to 0.1. Any of the ordinary forms of formaldehyde, such as paraformaldehyde and trioxane, as well as various formaldehyde liberating substance, such as methylal and hexamethylenetetramine can be used.

The polyamides useful in this invention, generally speaking, comprise the reaction product of a linear polymer-forming composition containing amide-forming groups, for example, reacting material consisting essentially of bifunctional molecules each containing two reactive groups which are complementary to reactive groups in other molecules and which include complementary amide-forming groups. These polyamides can be obtained by the methods given in the above mentioned patents and by other methods, for example, by self-polymerization of a monoaminocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acid, and amino alcohols is intended to include the equivalent amide-forming derivatives of these reactants. The above described polyamides have a unit length, as defined in previously mentioned patents of at least 7, and have an average number of carbon atoms of at least two separating the amide groups. These linear polyamides include also polymers, as for instance the polyesteramides, obtained by admixture of other linear polymer-forming reactants, as for instance glycol-dibasic acid mixtures or hydroxy acids, with the mentioned polyamide-forming reactants. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid. The term "polyamide" is used in its broad sense and includes polythioamides, for example those described in United States Patent 2,201,172, and polysulfonamides, for example those obtained by reacting a disulfonyl halide with a diamine as described in United States Patents 2,321,890 and 2,321,891.

The N-alkoxymethyl polyamides can be used as unsupported wrapping film, as coatings on fabric for use as a leather substitute, as an adhesive, as fibers, particularly as elastic fibers, and as molded articles. The high viscosity products obtained by use of this invention have greater flex durability, higher tear resistance and better elastic recovery than low viscosity products. These N-alkoxymethyl polyamides are useful as inner layers for safety glass, in which sheets of glass or plastics are separated and reinforced by these N-alkoxymethyl polyamides.

As many apparently widely different embodiments of this invention may be made without departing from the spirit and scope thereof, it is to be understood that I do not limit myself to the specific embodiments thereof except as defined in the appended claims.

I claim:

1. A process for converting a linear polyamide of high intrinsic viscosity to the corresponding N-alkoxymethyl polyamide without substantial degradation of the polyamide chain, said process comprising heating to reaction temperature in intimate contact with a buffered catalyst a liquid reaction mixture in which the reactants consist of formaldehyde, an aliphatic alcohol in which alcoholic hydroxyl is the sole reactive group, and a synthetic linear polyamide having an intrinsic viscosity of at least 0.4, having recurring hydrogen-bearing carbonamide groups as an integral part of the main polyamide chain, and having an average of at least 2 carbon atoms separating the carbonamide groups, said catalyst consisting of a buffered oxygen-containing acid which is contained in solution in said liquid reaction mixture and which is present therein at a pH greater than 1.5 and less than 6.5, said oxygen-containing acid being present in said liquid reaction mixture in a concentration of from 0.1% to 2.0%, said oxygen-containing acid having an ionization constant of at least $9.6 \times 10^{-6}$ and an equivalent conductance no greater than 370 ohms$^{-1}$/cm.$^2$ at 25° C. and 0.01N concentration, the buffering material contained in said buffered catalyst being chosen from the class consisting of tertiary amines and alkali salts of weak acids.

2. The process set forth in claim 1 in which said oxygen-containing acid is phosphoric acid and in which the buffering material is a tertiary amine.

3. The process set forth in claim 1 in which said oxygen-containing acid is phosphoric acid and in which the buffering material is pyridine.

4. The process set forth in claim 1 in which said oxygen-containing acid is phosphoric acid and in which the buffering material is an alkali salt of a weak acid.

5. The process set forth in claim 1 in which said oxygen-containing acid is phosphoric acid and in which the buffering material is disodium phosphate.

6. The process set forth in claim 3 in which said synthetic linear polyamide is polyhexamethyleneadipamide.

7. The process set forth in claim 5 in which said synthetic linear polyamide is polyhexamethyleneadipamide.

THEODORE LE SUEUR CAIRNS.

REFERENCES CITED

The following references are of record in the file of this patent:

UNITED STATES PATENTS

| Number | Name | Date |
|---|---|---|
| 2,132,671 | Bauer | Oct. 11, 1938 |
| 2,173,005 | Strain | Sept. 12, 1939 |
| 2,244,184 | Austin et al. | June 3, 1941 |
| 2,317,181 | D'Alelio | Apr. 20, 1943 |